United States Patent Office 2,857,029
Patented Oct. 21, 1958

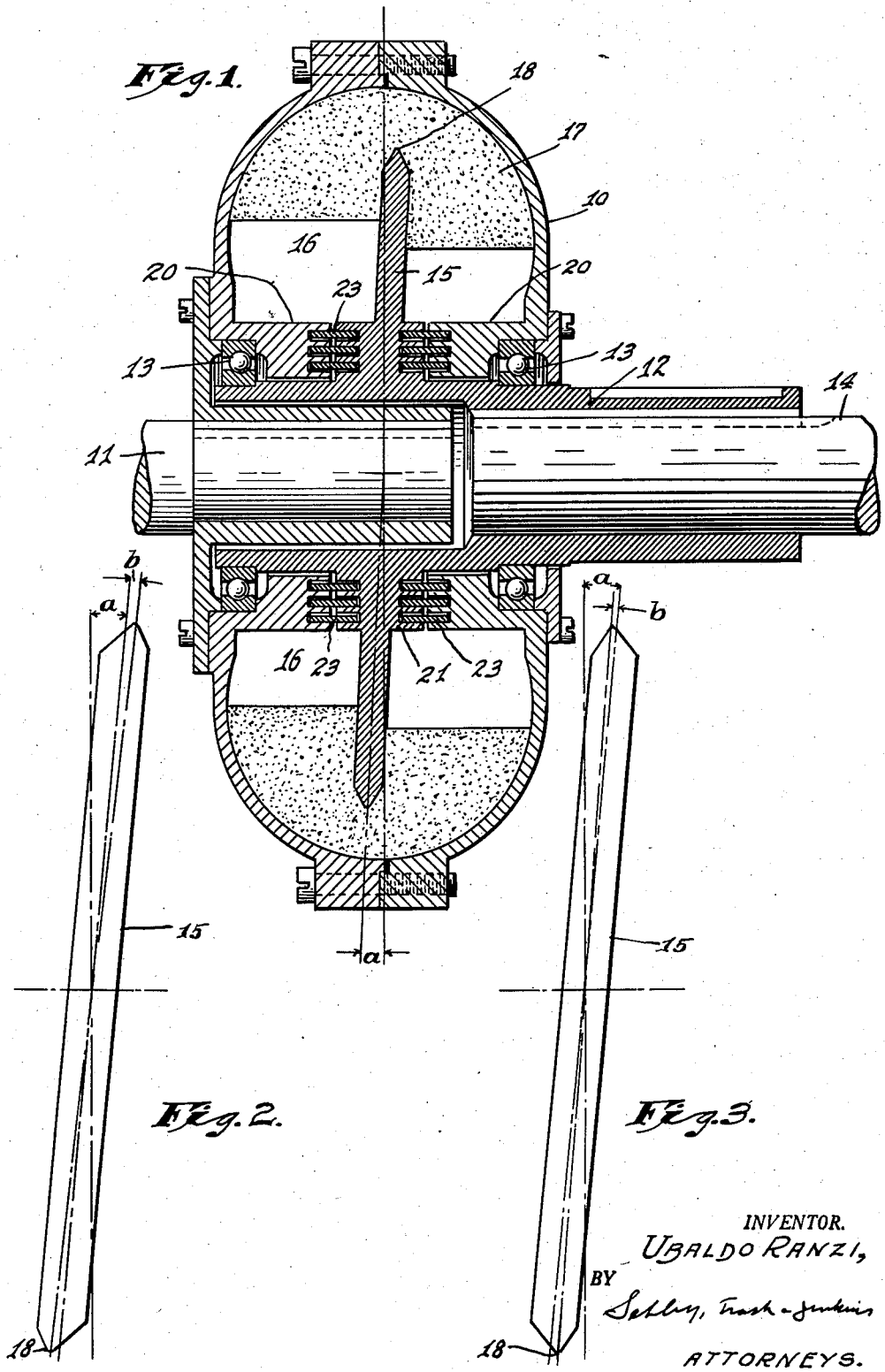

2,857,029

TORQUE-TRANSMITTING COUPLING

Ubaldo Ranzi, Legnano, Italy

Application November 22, 1955, Serial No. 548,465

Claims priority, application Italy August 3, 1955

7 Claims. (Cl. 192—58)

This invention relates to torque-transmitting couplings of the powder type such as are shown, for example, in my prior Patent 2,717,678. Such couplings include a supply of powdered or granular material confined in a space or spaces defined by relatively rotatable driving and driven members, the torque being transmitted by friction from the driving member to the driven member through the granular material. In couplings of this type, the driving and driven elements may rotate at the same speed or at different speeds, depending upon operating conditions.

For reasons noted in the prior patent above referred to, it is desirable to so construct the coupling that during periods of slippage—i. e., periods in which the driving and driven members are rotating at different speeds—the powder will be circulated or otherwise maintained in a state of agitation. Such circulation or agitation of the powder favors the escape of the heat generated by friction during periods of slippage and also provides a better, more progressive and smoother torque-transmission during slippage.

It is an object of this invention to produce a torque-transmitting coupling of the powder type in which agitation of the powder during periods of slippage can be effected in a simple and positive manner.

In carrying out my invention, I employ as one coupling element a hollow casing and as the other element a disk disposed within that casing and rotatable about the coupling axis but located in a plane disposed at an angle of less than 90° to its axis of rotation. The casing contains a supply of powdered or granular material sufficient in amount to extend around the periphery and radially inward along the sides of the disk when the coupling is in operation. When relative rotation of the disk and casing occur, flow occurs within the powder mass as a result of the inclined disposition of the disk; and such flow serves continually to replace the powder granules which are in contact with the disk and favors the dissipation of heat generated by friction between the powder and the disk.

In the accompanying drawing, which illustrates the invention:

Fig. 1 is an axial section through a coupling illustrating the condition existing during operation;

Fig. 2 is a side elevation of the coupling-disk illustrating a modified form thereof; and Fig. 3 is a view similar to Fig. 2 illustrating a further modification.

The coupling illustrated in the drawing comprises a hollow circular casing 10 rigidly secured to a shaft 11. The other element of the coupling comprises a central hub 12 which is rotatably supported from the housing 10, conveniently through the medium of anti-friction bearings 13, and which is adapted to be secured to a shaft 14. In the combination illustrated, the shaft 11 will ordinarily be the drive shaft and the shaft 14 the driven shaft; and the following description will proceed in the assumption that such is the case. Within the housing 10, the driven element 12 is provided with a disk 15 spaced radially and axially from the inner surface of the casing to provide a space 16 within which a mass 17 of powdered or granular material is located. As above noted, the disk 15 is disposed at an angle of less than 90° to the axis of the coupling and preferably is beveled on opposite sides at its periphery to produce an annular edge 18.

When a coupling such as has been described is placed in operation, centrifugal force causes the powder 17 to distribute itself circumferentially on the inner surfaces of the casing 10. A loose powder possesses some of the characteristics of a liquid in respect to its ability to transmit pressure in all directions but differs from a liquid in that such transmission of pressure is not equal in all directions. The centrifugal force resulting from rotation of the housing 10 generates a pressure which causes the mass of the powder to bear against the surfaces of the disk and casing, thus creating friction reflected as a torque tending to cause the disk 15 and shaft 14 to rotate with the casing. However, if the torque opposing rotation of the shaft 14 is substantial, the frictional force exerted by the powder on the disk will not be sufficient initially to cause the disk and shaft 14 to rotate; but as the speed of the casing increases, the pressure within the powder mass will increase with rising centrifugal force and the powder will bear with increasing pressure on the sides of the disk until the frictional drag on the disk-surfaces becomes sufficient to cause rotation of the driven element of the coupling. Eventually, if the coupling is properly designed with respect to its requirements, the driving and driven elements of the coupling will rotate as a unit.

The greatest pressure due to centrifugal force within the mass 17 of the powder will exist at the point in such mass most remote from the axis of rotation. Since the internal diameter of the casing is greater than the diameter of the disk, the greatest pressure within the powder will therefore exist adjacent the inner surface of the casing; and both because of that fact and because the powder-engaged surfaces of the casing are, on the average, more nearly perpendicular to the direction in which centrifugal force acts, the frictional drag between the casing and the powder tends to be substantially greater than that between the powder and disk. As a result, the mass of powder tends to rotate with the casing and to slip over the disk-surfaces when the two coupling elements are rotating at different speeds.

Referring to Fig. 1, it will be apparent that as a result of the inclined disposition of the disk 15, the powder which lies to the left of the disk at the top of the casing will be subjected to an axial pressure as the powder and casing rotate through an angle of 180° relative to the disk. In similar fashion, the powder which lies to the right of the disk 15 and at the bottom of the casing will be subjected to axial pressure during the same 180° of relative rotation. The axial pressure on the powder causes a displacement thereof, such displacement being indicated in the drawing by the different levels of the powder on opposite sides of the disk. Generally, the free inner surface of the powder mass on each side of the disk will be cylindrical, but will be eccentric with respect to the axis of rotation, and the eccentricity of such free surface will reverse itself at each 180° of rotation of the casing relative to the disk.

As a result of the powder-displacement just described flow occurs within the mass of the powder continually replacing the powder grains which are in contact with the disk and, in effect, creating convection currents of powder carrying away from the disk the heat generated by the friction between it and the powder. In addition, the energy required to effect displacement of the powder is reflected as an increase in the rotative effort exerted by the powder on the disk. In other words, since the powder-engaged surfaces of the disk are not surfaces of revolution concentric with the coupling axis, the pressure of the powder against them has a net tangential component which augments friction tending to rotate the disk. Finally, the displacement of the powder, which continues as long as any slippage exists, makes for a more regular increase of the torque applied to the disk and provides smoother operation.

One of the advantages of the coupling above described lies in the fact that its operation is the same irrespective of the direction in which the coupling rotates. Prior powder-type couplings provided with means for effecting agitation or circulatory flow of the powder during periods of slippage have possessed certain unidirectional characteristics in that they could transmit torque more effectively in one direction of rotation than in the other; but, as just noted, the present coupling is capable of transmitting torques with equal effectiveness in both directions.

In the drawings I have indicated by the reference letter $a$ the angle by which the median plane of the disk 15 departs from perpendicularity with respect to the coupling axis. Within limits, the larger that angle, the greater will be the agitation which occurs within the powder mass when the coupling is slipping and the greater will be the effective torque applied to the disk at any given speed of casing rotation. Because of the latter characteristic, it is possible to provide couplings meeting a wide range of torque-transmitting characteristics. The angle $a$ can be made so large that the mass of powder will tend to rotate with the disk rather than with the casing, but such a condition would usually be undesirable.

Some modification in the performance of the coupling can be obtained through the manner in which the disk is beveled to provide the edge 18. In Fig. 1, the disk is so beveled that the edge 18 lies in the median plane of the disk; but as indicated in Figs. 2 and 3, it can be beveled so that the plane of the edge 18 is at an angle $b$ to the plane of the disk. The angle $b$ may be either additive to the angle $a$ (Fig. 2) or lie within the angle $a$ (Fig. 3). The former modification has to an extent the same effect on coupling performance as increasing the angle $a$, while the latter has the same effect as decreasing the angle $a$.

To prevent entrance of any powder 17 into the bearings 13, I may provide the sealing arrangement illustrated in Fig. 1. In that arrangement, the casing 10 is formed with annular flanges 20 extending toward each other and receiving between them an annular flange 21 which is integral with the hub 12 of the driven element and from which the disk 15 projects. The opposed faces of the flanges 20 and 21 are provided with aligned annular grooves, and in each pair of aligned grooves a ring 23, preferably of a suitable bearing metal is received.

A coupling of the type above described is especially well suited to serve as a driving connection between an electric motor of low starting torque and a load possessing a substantially higher starting torque. When the motor is placed in operation, the powder mass 17 distributes itself around the periphery of the casing 10 under the influence of centrifugal force; but because of the low initial speed, the pressure within the powder mass and the frictional drag on the disk are low, and little opposition is imposed on rotation of the driving motor. As the speed of the motor and casing increase, however, the pressure due to centrifugal force and the frictional drag of the powder on the disk likewise increase until the starting torque of the load is reached, whereupon the driven element of the coupling begins to rotate. As rotational speed continues to increase, the torque applied through the powder to the driven element likewise increases and eventually a condition is reached in which the driving and driven elements rotate at the same speed.

The rate at which the driving element picks up the load can be controlled, as above noted, by varying the angle $a$, the angle $b$, or both such angles.

I claim as my invention:

1. A torque-transmitting coupling, comprising relatively rotatable, coaxial driving and driven elements, one of said elements including a hollow casing and the other a disk-like member located within said casing, said disk having a diameter less than the internal diameter of the casing and side surfaces spaced axially from side walls of the casing, and a supply of particulate within said casing, said disk in its entirety being disposed at an acute angle to the axis of the coupling element which includes said disk.

2. A coupling as set forth in claim 1 with the addition that both sides of the disk are beveled to provide a peripheral edge.

3. A coupling as set forth in claim 2 with the addition that said peripheral edge lies in a plane at an angle to the median plane of the disk.

4. A torque-transmitting coupling as set forth in claim 1 with the addition that the element including said disk has a hub portion, said casing having inwardly presented faces disposed in opposed relation to end faces of said hub portion, said opposed faces having annular grooves of equivalent diameter, and a sealing ring received in said grooves.

5. A torque-transmitting coupling as set forth in claim 1 with the addition that the marginal portion of the disk is beveled to provide a peripheral edge.

6. A torque-transmitting coupling comprising relatively rotatable driving and driven elements, said driving element being a hollow casing, said driven element comprising a driven shaft having a disk rotatable therewith and located within said casing, said disk having a diameter less than the internal diameter of said casing and opposite side surfaces spaced from the side walls of said casing, said casing being partially filled with particulate material which serves as the torque-transmitting medium between said elements, the side surfaces of the disk being planar and parallel and disposed at an acute angle to the axis of the driven element.

7. A torque transmitting coupling comprising relatively rotatable driving and driven elements, said driving element being a hollow casing having opposed, spaced side walls and a peripheral wall which is smoothly curved in axial section and joins said side walls substantially tangentially, said driven element comprising a driven shaft having a disk rotatable therewith and located within said casing, said disk having a diameter less than the internal diameter of said casing and opposite side surfaces spaced from the side walls of said casing, said casing being partially filled with particulate material which serves as the torque-transmitting medium between said elements, the side surfaces of the disk being planar and parallel and disposed at an acute angle to the axis of the driven element.

References Cited in the file of this patent

UNITED STATES PATENTS

| 1,925,898 | Fritz | Sept. 5, 1933 |
| 2,419,681 | Gartmann | Apr. 29, 1947 |
| 2,631,705 | Winther | Mar. 17, 1953 |

FOREIGN PATENTS

| 457,159 | Canada | May 31, 1949 |
| 153,095 | Australia | Sept. 3, 1953 |
| 1,077,609 | France | May 5, 1954 |